United States Patent Office 3,250,625
Patented May 10, 1966

3,250,625
PARTIALLY YEAST-CHEMICALLY LEAVENED
LAMINATED FOODSTUFFS
Ray J. Thelen, 6501 5th Ave. S., Minneapolis, Minn.
No Drawing. Filed Aug. 26, 1963, Ser. No. 304,648
4 Claims. (Cl. 99—86)

This invention relates to new and very useful flavored, flour-based, partially yeast-leavened and partially chemically-leavened, cooked foodstuffs which have a characteristic continuously-cellulated, self-supporting structure independently of the amount of flavoring incorporated therein over wide ranges.

More particularly, my invention is directed to cooked and intermediate flour-based foodstuffs wherein a layer of yeast-leavened dough is laminated to a layer of chemically-leavened paste, such paste contains the flavoring mixed therein. My invention is also directed to processes for making such foodstuffs.

Heretofore, flavoring has been incorporated into yeast-leavened doughs by the steps of sheeting such dough, spreading over the sheeted dough water or oil, then topping with a thin layer of cinnamon-sugar or other dry topping, or topping the so-treated dough sheet with a solid or semi-solid, unleavened particulated flavoring. Thereafter, the resulting coated dough sheet is rolled or curled, shaped, and/or cut as desired, optionally stored, and finally baked. The water or oil is needed to retain the dry flavoring in a desired position on the dough sheet during subsequent processing. The resulting baked products, however, commonly contain voids or air sacs varying in size from ¼ inch in diameter to ¾ inch or larger which develop during final proofing and are exaggerated during baking. These air sacs or voids are located between the former adjacent faces of the coiled, coated dough sheet in the region of the flavoring.

These voids are a considerable problem especially in loaf-type baked foods because they severely reduce the structural integrity and stability of the baked products making them difficult to handle, store, and process before consumption. For example, such products commonly break apart during normal buttering, toasting, and like procedures in a consumer's hands before they can be eaten.

Products of this invention are almost always free of the voids and air sacs which commonly occur when employing conventional pastes and methods. My discovery results in novel flour-based, flavored, leavened, baked foods having superior structural stability using ingredients, procedures and equipment already well known to the baking industry.

It is therefore an object of this invention to provide methods for making flour-based foods having continuously-cellulated, self-supporting structures using conventional yeast-leavened doughs and conventional chemically-leavened paste, similar to cake batters, cookie doughs, or the like.

Another object is to provide intermediate or uncooked flour-based foods wherein a sheet of yeast-leavened dough is laminated to a chemically-leavened paste.

Another object is to provide cooked flour-based, flavored, leavened foods having continuously-cellulated, self-supporting structures and wherein a yeast-leavened layer is directly and continuously associated on at least one surface with a chemically-leavened layer.

Additional objects of this invention will become apparent to those skilled in the art from the following detailed description.

In practicing my invention one can employ any yeast-leavened dough. Such doughs can be prepared in any one of a variety of ways using, for example, the sponge and dough system, the straight dough system, the brew system, the continuous dough system, or the like. The chemical composition of a yeast-leavened dough can vary widely, depending upon a number of variables such as whether the product is to be lean or rich in calorie content, type of product being prepared, type of ingredients to be used in combination with the flour and yeast, etc. In fact, so many are the types of yeast-leavened doughs that it is not practicable to give a single or simple formulation that will accurately cover all yeast-leavened dough types.

Thus, the dough type used can range from a very lean hearth-type bread dough consisting of water, flour, salt and yeast (60 parts by weight of water, 100 parts by weight of flour, 2 parts by weight of salt, and 1 to 2 parts by weight of yeast) to the very richest of yeast-leavened pastry-type doughs consisting of 100 parts by weight of flour, 50 parts by weight of liquid, 10 to 12 parts by weight of yeast, 2 parts by weight of salt, 20 to 30 parts by weight of sugar, 30 to 45 parts by weight of shortening, 0 to 20 parts by weight of eggs, 6 to 8 parts by weight of non-fat dry milk or liquid milk equivalent, and flavorings and/or spices as required to suit consumer taste.

As those of ordinary skill in the art know, yeast doughs, regardless of type used, may include fruits, meats, seafoods, dairy products, spices, vegetables, nuts, seeds, etc. Thus, as examples one can cite raisin bread which can include up to 50 percent as much or more raisins as dough, cheese bread which may include 25 percent or more cheese as dough, orange-nut bread which may include 10 to 20 parts by weight or more of ground oranges and chopped nutmeats.

In general, however, the term "yeast-leavened dough" as used herein refers to a soft mass of yeast-containing, moistened flour which has been mixed, fermented, and processed in the customary ways and has a physical consistency suitable for sheeting and which when baked or otherwise cooked expands into a cellular or cellulated, self-supporting structure. Yeast-leavened doughs characteristically have total flour contents falling in the range from about 50 to 75 percent of the total yeast-leavened dough mass, especially as used in this invention.

Also, in practicing my invention I can employ as the chemically-leavened paste any non-yeast or air-leavened cake batter, cookie dough, or the like. As in the case of yeast-leavened doughs, chemically-leavened doughs can be prepared in any one of a variety of ways, as demonstrated by the instructions of virtually any reference book on cooking. Generally speaking, such pastes contain flour, shortening (which is bland and does not contribute by itself to produce flavoring), structure building materials (commonly derived from or consisting of eggs), flavoring, and water. Owing to the variety of possible formulations, it is not meaningful to give one generalized formulation accurately embracing all chemically-leavened dough types.

However, it will be understood that the term "chemically-leavened" or equivalent as used herein refers to a combination of sodium bicarbonate with acidifiers such as tartrates, phosphates, oxalates, and the like and which acts by giving off carbon dioxide gas during baking.

Similarly, the term "flavoring" or equivalent as used herein has reference to any one or more of the solid, semi-solid, or liquid materials of natural or synthetic origin which are used to impart flavor to cooked foods and includes such various items as salt, sugar, nuts, fruits, plant extracts, and the like, as those skilled in the art appreciate.

Thus, the term "chemically-leavened paste" as used herein has reference to a chemically-leavened mixture of flour, water, flavoring, and other ingredients, which mixture has a viscosity ranging from a thin, pourable consistency to a thick, putty-like consistency and which when baked other otherwise cooked expands into a cellular or cellulated, self-supporting structure. Chemically-leavened pastes characteristically have total flour contents falling in the range from about 10 to 25 weight percent, especially as used in this invention.

Largely because of the fact that chemically-leavened or air-leavened pastes usually always have characteristically lower total flour contents than the total flour contents of yeast-leavened doughs, plus the fact that chemically-leavened or air-leavened pastes usually always contain eggs which are known to be excellent structure building material, one can incorporate generally higher quantities of flavoring in chemically-leavened or air-leavened pastes compared to yeast-leavened doughs. In making the products of my invention, I like to take advantage of this fact and so prefer to introduce larger quantities of flavoring into the chemically-leavened pastes than into the yeast-leavened doughs. Then, in the cooked products, the yeast-leavened dough can act as what might be called the "foundation" while the chemically-leavened paste can act as what might be called the "framework" which "houses" the flavoring.

I find it easy and practicable to use a chemically-leavened paste formulation wherein the weight percentage of flour ranges from 10 to 25 percent and the weight percentage of flavoring is at least 10. When potent flavors such as cinnamon, nutmeg, allspice, etc., are used, the weight percentage of flavoring used is less as required to realize the desired flavor characteristics. In such a formulation I maintain the total liquid content in chemically-leavened paste below 35 weight percent. The balance up to 100 weight percent comprises the shortening, non-fat dry milk, and the other ingredients usually used in the production of chemically-leavened or air-leavened pastes.

Following preparation of the yeast-leavened dough and of the chemically-leavened paste, intermediate or uncooked products of the invention can be made.

First, the yeast-leavened dough is sheeted by any convenient procedure. Commercially, for example, the dough would be sheeted onto a moving conveyor belt by any readily available dough processing equipment such as Anetsberger, Moline or Stickleber. I prefer to form dough sheets having a thickness of from about 1/16 to 3/8 inch.

Next, the chemically-leavened paste is applied to the top or exposed face of the dough sheet using any convenient procedure such as spatula application. Commercially this can be done, for example, by pumping the chemically-leavened paste upon the sheeted dough moving on a conveyor belt in the form of longitudinally extending, spaced parallel ribbons of chemically-leavened paste, as from an Alemite pump or the like. Thereafter, a stationary spreader can be used to flatten the ribbons upon the yeast-leavened dough to produce a continuous layer of chemically-leavened paste over the top face of the dough sheet. I prefer to use chemically-leavened paste thicknesses in the range from about 1/16 to 3/8 inch. While no special precautions, procedure, or the like need be observed in forming the laminations of chemically-leavened paste and yeast-leavened sheeted dough, naturally the chemically-leavened paste should be uniformly spread upon the desired area of the sheeted dough so as to avoid any entrainment of air bubbles between the chemically-leavened paste layer and the yeast-leavened dough layer or sheet.

Often, the next step after formation of the laminate of chemically-leavened paste and yeast-leavened dough is to curl or roll the laminate, if the food product being manufactured is to be in a roll form.

Rolling is not at all necessary to make products within my invention, since I have found it possible using my invention to make many delicious food products which are in a generally flat or folded form and consist of alternating layers of chemically-leavened paste and yeast-leavened dough arranged in sandwich or stack fashion. One excellent type of flat product utilizes a bottom layer and a top layer each of yeast-leavened dough and a middle or middle or intermediate layer of chemically-leavened paste. To make such a product, one can simply sheet out a layer of yeast-leavened dough, top with a layer of chemically-leavened paste and then another yeast-leavened layer of sheeted dough forming a sandwich on the moving conveyor belt as in the illustration given above.

When a two-layer laminate of chemically-leavened paste and yeast-leavened dough is curled, however, such curling is conveniently accomplished by using a conventional curler which results in the formation of a string of coiled laminate which extends longitudinally of the conveyor belt. The string is preferably rather tightly wound so as to achieve uniform contact between adjoining faces of layers therein.

The curled dough string and the flat sandwich-like structures are each further processed in any way desired, or formed into any shape desired by suitable cutting and/or shaping operations. The resulting intermediate or uncooked products are very useful in commerce, for they can be stored, as by refrigeration or freezing, for subsequent use. When suitably packaged, these intermediate products are attractive consumer products in the frozen food field.

The intermediate products are cooked by any conventional procedure, usually baking; though, by suitable selection of chemically-leavened paste and yeast-leavened dough, laminated intermediate food products can be prepared for deep-fat frying as the final cooking step prior to eating. Since the yeast-leavened dough and the chemically-leavened paste are each of generally conventional composition, and since the cooking of such materials is a matter of everyday familiarity to those of ordinary skill in the culinary arts, no detailed description respecting same is given herein.

The invention will be further illustrated by reference to the following examples:

A. EXEMPLARY TYPES OF YEAST-LEAVENED DOUGH

1. Bread dough

|  | Lbs. | Oz. |
|---|---|---|
| Bleached hard wheat flour | 12 | 8 |
| Yeast |  | 4 |
| Salt |  | 4 |
| Non-fat dry milk |  | 6 |
| Sugar |  | 12 |
| Shortening (hydrogenated veg. oil) |  | 10 |
| Yeast food |  | 1½ |
| Water | 8 | 2 |

Place all materials in a dough mixer and mix until the dough is smooth and pliable. The dough is allowed to ferment in a warm place (80° F.) for approximately two hours. The dough is now ready to be sheeted for lamination with the chemically-leavened paste.

2. Dinner roll dough

|  | Lbs. | Oz. |
|---|---|---|
| Bread and pastry flour | 12 | 8 |
| Yeast |  | 10 |
| Salt |  | 4 |
| Water | 6 | 4 |
| Non-fat dry milk |  | 12 |
| Sugar | 1 | 4 |
| Shortening (hydrogenated veg. oil) | 1 | 4 |
| Eggs (whole) |  | 10 |
| Yeast food |  | 1½ |
| Flavorings, spices, and/or coloring |  | ½ |

Place all materials in a dough mixer and mix until the dough is smooth and pliable. The dough is allowed to ferment in a warm place (80° F.) for one and one-half to two hours. The dough is now ready to be sheeted for lamination with the chemically-leavened paste.

3. Basic sweet dough

|  | Lbs. | Oz. |
|---|---|---|
| Bread and pastry flour | 12 | 8 |
| Yeast | | 1 |
| Salt | | 4 |
| Water | 5 | 10 |
| Non-fat dry milk | | 12 |
| Sugar | 2 | 8 |
| Shortening (hydrogenated veg. oil) | 2 | |
| Whole eggs | 1 | 14 |
| Flavorings, spices, coloring, or other variation materials | | ½ |

Place all materials in a dough mixer and mix until the dough is smooth and pliable. Permit the dough to ferment in a warm place (80° F.) for one and one-half to two hours. The dough is now ready to be sheeted for lamination with the chemically-leavened paste.

4. Yeast raised fried food dough

|  | Lbs. | Oz. |
|---|---|---|
| Bread and pastry flour | 12 | 8 |
| Water | 6 | 14 |
| Yeast | | 8 |
| Yeast food | | 1½ |
| Sugar | 1 | |
| Shortening | 1 | 14 |
| Salt | | 4 |
| Whole eggs | 1 | 4 |
| Flavorings, spices, coloring, etc | | ½ |

Place all materials is a dough mixer and mix until the dough is smooth and pliable. Permit the dough to ferment in a warm place (80° F.) for one and one-half to two hours. The dough is now ready to be sheeted for lamination with the chemically-leavened paste.

5. Danish pastry dough

|  | Lbs. | Oz. |
|---|---|---|
| Bread and pastry flour | 12 | 8 |
| Yeast | 1 | 4 |
| Salt | | 3½ |
| Water (variable) | 5 | 10 |
| Non-fat dry milk | 6 | 12 |
| Sugar | 2 | 14 |
| Shortening | 2 | 8 |
| Eggs | 2 | 8 |
| Flavoring | | ½ |

Place all materials in dough mixer bowl, then with a dough hook mix at medium speed only until a smooth dough results. Allow the dough to ferment for about 30 minutes, then divide it into units of an easy manageable size (12 to 16 pounds), place in retarder to chill for approximately one hour. Remove from dough retarder and sheet each unit three times as long as wide and approximately ⅝ inch thick. Spot or spread roll-in shortening (butter, margarine, etc.) at the rate of about four ounces per pound of dough over two-thirds of the dough face. Fold the unspotted third over the center third and the remaining spotted third over it. With the sealed sides parallel to the length of the work surface, again roll the dough three times as long as wide and approximately ⅝ inch thick. Fold it in thirds as was done in the case of the spotting in roll. Place it on a standard 18 by 26 inch flour-dusted sheet pan and place it in a dough retarder for 30 to 60 minutes. Repeat the rolling and folding procedure just described twice more, allowing a 30 to 60-minute rest between rollings. Rest for several hours after the last rolling and folding operation. After the final rest period, the dough is ready for lamination.

B. EXEMPLARY TYPES OF CHEMICALLY-LEAVENED PASTES

1. Coffee cake paste

|  | Lbs. | Oz. |
|---|---|---|
| Granulated sugar | 6 | |
| Shortening | 1 | 6 |
| Butter | 1 | 6 |
| Honey | | 8 |
| Salt | | 1 |
| Soda | | ½ |
| Whole eggs | 2 | 14 |
| Liquid milk | 3 | |
| Cake flour | 7 | 8 |
| Baking powder | | ½ |
| Vanilla flavoring | | 1 |
| Cinnamon | 1 | |

Blend together the sugar, shortening, butter, honey, salt, cinnamon and soda until they are smooth. Add eggs in three or four portions incorporating thoroughly. Next the milk is added alternately with the cake flour mixing until a smooth, drop cookie consistency is obtained. Thin down with eggs or egg whites to proper spreading consistency if necessary. The paste is now ready for lamination with the yeast-leavened dough.

2. Chocolate paste

|  | Lbs. | Oz. |
|---|---|---|
| Granulated sugar | 6 | |
| Cocoa (light Dutch) | 1 | |
| Shortening | 1 | 6 |
| Butter | 1 | 6 |
| Honey | | 8 |
| Soda | | ½ |
| Salt | | ½ |
| Vanilla flavoring | | 1 |
| Whole eggs | 2 | 14 |
| Liquid milk | 3 | |
| Cake flour | 7 | 8 |
| Baking powder | | ½ |

Cream together thoroughly the sugar, cocoa, shortening, butter, honey, soda, salt and vanilla. Add eggs in three or four portions mixing thoroughly. Next the milk is added alternately with the cake flour and baking powder mixing until a smooth, drop cookie consistency is obtained. If necessary, thin down with eggs or egg whites to proper spreading consistency. The paste is now ready for lamination with the yeast-leavened dough.

3. White paste

|  | Lbs. | Oz. |
|---|---|---|
| Cake flour | 6 | |
| Emulsified shortening | 2 | |
| Salt | | 2 |
| Skim milk solids | | 3 |
| Egg whites | 4 | 12 |
| Water | 1 | |
| Baking powder | | 4 |
| Sugar | 5 | |
| Vanilla flavoring | | 1 |

The sugar, shortening, salt, milk solids, and vanilla are creamed together thoroughly. Next, the water is added alternately with the cake flour and baking powder and mixed well. Next, the egg whites are whipped until stiff but not dry and then folded into the above mixture to form a paste of proper spreading consistency. The paste is now ready to be laminated on a yeast-leavened dough.

4. Cheese paste

|  | Lbs. | Oz. |
|---|---|---|
| Sugar | 5 |  |
| Shortening | 1 | 8 |
| Cream cheese | 1 | 8 |
| Dehydrated cheddar |  | 8 |
| Salt |  | 3 |
| Non-fat dry milk |  | 8 |
| Whole eggs | 2 | 8 |
| Cake flour | 5 | 12 |
| Baking powder |  | 2 |
| Water (variable to obtain spreadable consistency) | 2 |  |

All of the dry materials, shortening, cheese and water are blended together until a smooth paste is formed. The eggs are added in three or four portions incorporating thoroughly after each addition. The paste is now ready for lamination with a yeast-leavened dough.

LAMINATES OF THE INVENTION

Example 1

To make a laminate using the yeast-leavened bread dough formulation A1 above and the chemically-leavened paste B1 above, one sheets the bread dough to a thickness of about ¼ inch and spreads thereover a chemically-leavened paste layer of approximately equivalent thickness. The resulting laminated flat structure is of sufficient size so that when rolled and shaped, it becomes approximately 3 inches across in diameter. The resulting loaf-like structure can either be frozen for storage as an intermediate food product of the invention, or baked. Here the rolls or loaf-like structures are baked in an oven for 20 to 23 minutes at 375° to 400° F. The baked products have continuously-cellulated, self-supporting structures, no separation at interfaces between layers being observed therein. The results are summarized in Table I below.

Example 2

Dinner roll dough A2 is sheeted to provide a sheet 20 inches wide and ⅜ of an inch thick. On the top of the sheet is spread uniformly a ¼ inch layer of chocolate paste B2 so that the paste layer covers one-half of the sheeted dough. The uncoated layer of dough is then folded over the coated layer and the resulting so-folded piece is cut into 1 inch strips each weighing about 3 to 4 ozs. Every three strips are then braided together and the ends of each braid are joined together to produce a unit which is in a ring shape. The resulting ring-shaped units can either be frozen for storage as an intermediate food product of the invention or they can be retarded by placing them in a refrigerator at a temperature from 34° to 40° F. Before baking the units are allowed to proof until the yeast-leavened dough doubles in size. The products are baked for 18 to 20 minutes at approximately 375° F. The baked products are topped with a conventional icing consisting of sugar, water, butter and corn syrup. The results are summarized in Table I below.

Example 3

The basic sweet dough A3 above is sheeted to a thickness of ¼ of an inch and a width of 9 to 10 inches, and then is coated on one face with a ¼ inch uniform layer of white paste B3 to form a laminated structure. Each laminated structure is curled into a string having a diameter of from about 1¾ inches to 2 inches. Each string is cut into 10 inch lengths approximately and then each string is partially cut with scissors at an angle of 45° with respect to a diameter so as to form a plurality of generally equally spaced cuts extending the length of each string. The cuts extend one-half to two-thirds of the way through each string length at regular intervals of about ½ to ¾ of an inch, and slices are alternated left to right. The result is a structure which resembles the back of an alligator. The resulting structures can either be frozen for storage as an intermediate food product of the invention or they can be retarded by placing them in a refrigerator at a temperature from 34° to 40° F. Before baking the units are allowed to proof until the yeast-leavened dough doubles in size. The products are baked for 18 to 20 minutes at approximately 375° F. The baked products are topped with a conventional icing consisting of sugar, water, butter and corn syrup. The results are summarized in Table I below.

Example 4

The yeast raised fried food dough A4 is formed into a sheet ¼ of an inch thick and 10 to 12 inches in width. Thereover is applied a ¼ inch layer of paste filling B4 uniformly over the entire face of the associated dough. The product laminate is rolled or coiled into string form, the resulting string having a diameter of about 2½ inches. The string is cut into slices each about ¾ of an inch in height. The slices are placed on frying screens and allowed to raise for a period of approximately 30 minutes. The screens are then immersed in deep fat maintained at a temperature from about 365° to 385° F. for about 2½ minutes. The so-fried products are glazed with a thin layer of powdered sugar-water mixture as they are removed from the deep fat. An alternative procedure is to remove the fat fried products, allow them to cool and then frost or otherwise decorate to suit taste. Optionally, the products, instead of being immediately fried following formation, may be retarded by placing them in a refrigerator at a temperature from 34° to 40° F. or the intermediate food products can be frozen in a temperature of from −20° to −40° F. for sale as such.

Example 5

Danish pastry dough prepared as described in A5 above is sheeted in 8 inch wide strips each ¼ to ⅜ of an inch in thickness. Each sheet is spread with a layer of equivalent thickness of paste B2 above. The resulting laminate is curled into string form, the string having a diameter of about 1¼ inches. The strings are sliced into slices each weighing approximately 1¼ ozs. The slices are placed in oiled standard muffin tins and allowed to double in bulk, after which the so-proofed slices are baked at 380° to 400° F. for 12 to 15 minutes. The baked slices are allowed to cool and then are decorated on their top sides with a conventional chocolate icing. Instead of being directly baked, the slices, before proofing, can be retarded for indefinite periods at temperatures maintained in the range of from 34° to 40° F. Alternatively, the slices, before proofing, can be frozen for indefinite periods at temperatures maintained in the range of from −20° to −40° F. for sale as such.

TABLE I

| Intermediate laminate (uncooked) | | | | | | Product laminate (End product description) | | | |
|---|---|---|---|---|---|---|---|---|---|
| Yeast-leavened dough | | | Chemically-leavened paste | | | Cooking process | | | |
| Ex. No. | Type | Layer thickness | Type | Layer thickness | Shape | Method | Temp. | Time | Comments |
| 1 | A1 | ¼" | B1 | ¼" | 3" roll diameter | Baked / Retarded or / Frozen | 375°–400° F / 34°–40° F / About −20° F | 20–23 min / 7–10 days / | Very prominent bullseye design in crum of loaf. |
| 2 | A2 | ⅜" | B2 | ¼" | 5 layer fold | Baked / Retarded or / Frozen | 375° F / 34°–40° F / −20°–−40° F | 18–20 min / 7–10 days / | Three strand braid design or three inch ring design. |
| 3 | A3 | ¼" | B3 | ¼" | 1¾" to 2" diameter curl | Baked / Retarded or / Frozen | 375° F / 34°–40° F / −20°–−40° F | 18–20 min / 7–10 days / | Coffee cake having appearance of alligator-back design. |
| 4 | A4 | ¼" | B4 | ¼" | 2½" diameter roll | Fried / Retarded or / Frozen | 385° F / 34°–40° F / −20°–−40° F | 2½–3 min / 7–10 days / | Two tone golden brown bullseye effect. |
| 5 | A5 | ¼ to ⅜" | B2 | ¼ to ⅜" | 1¼" diameter | Baked / Retarded or / Frozen | 375°–400° F / 34°–40° F / −20°–−40° F | 12–15 min / 7–10 days / | Cupcake—half cake, half pastry. |

While I have shown and described specific and preferred embodiments above, I wish it to be specifically understood that the same are capable of modification without departure from the spirit and scope of the appended claims.

The claims are:

1. A cooked flour-based food product comprising a continuously cellulated self-supporting structure characterized by:
   (a) a yeast-leavened dough sheet bonded on at least one surface with a chemically-leavened flavor paste layer,
   (b) said yeast-leavened dough sheet having a total flour content in the range from about 50 to 75 weight percent based on total weight of yeast-leavened dough, and
   (c) said chemically-leavened flavor layer having a total flour content in the range of from about 10 to 25 weight percent based on total weight of chemically-leavened dough and by having a total flavoring content of at least about 10 weight percent.

2. The product of claim 1 wherein said leavened paste layer is further characterized by having a water content not greater than about 35 weight percent based on total weight of leavened paste and a flavoring content about 10 weight percent, based on total weight of leavened paste as required to realize the desired flavor characteristics.

3. The product of claim 1 wherein said leavened flavored paste layer contains a total flavoring content less than about 10 weight percent and such flavoring is a potent flavor.

4. A cooked flour-based food product comprising a continuously-cellulated, self-supporting structure, said structure being characterized by having at least one layer of a yeast-leavened dough bonded on at least one surface to a layer of a chemically-leavened, flavor paste.

References Cited by the Examiner
UNITED STATES PATENTS

| | | | |
|---|---|---|---|
| 1,946,495 | 2/1934 | Jones | 99—86 |
| 1,975,326 | 10/1934 | Loose et al. | 107—54 |
| 2,060,490 | 11/1936 | Borbely | 99—86 |
| 2,598,282 | 5/1952 | Melnick | 99—139 |
| 2,627,825 | 2/1953 | Stiles | 107—54 |
| 3,142,573 | 7/1964 | Erekson et al. | 99—90 |

OTHER REFERENCES

"Betty Crocker's Picture Cook Book," first edition, 1950, McGraw-Hill Book Company, Inc., New York, pp. 100 and 106.

A. LOUIS MONACELL, *Primary Examiner.*

RAYMOND N. JONES, *Examiner.*